United States Patent
Oldervoll et al.

(10) Patent No.: US 7,483,335 B2
(45) Date of Patent: Jan. 27, 2009

(54) PERMANENTLY INSTALLED SEISMIC OCEAN BOTTOM CABLE

(75) Inventors: Magne Oldervoll, Os (NO); Bjarte Fageraas, Missouri City, TX (US)

(73) Assignee: ION Geophysical Corporation, Houston, TX (US)

( * ) Notice: Subject to any disclaimer, the term of this patent is extended or adjusted under 35 U.S.C. 154(b) by 207 days.

(21) Appl. No.: 10/308,705

(22) Filed: Dec. 2, 2002

(65) Prior Publication Data

US 2003/0223822 A1  Dec. 4, 2003

Related U.S. Application Data

(60) Provisional application No. 60/334,284, filed on Nov. 30, 2001.

(51) Int. Cl.
 *G01V 1/38* (2006.01)
(52) U.S. Cl. ............ 367/15; 367/20; 367/153; 367/154
(58) Field of Classification Search ............ 367/15, 367/16, 20, 153, 154; 174/101.5; 405/158
See application file for complete search history.

(56) References Cited

U.S. PATENT DOCUMENTS

| | | | | |
|---|---|---|---|---|
| 2,871,665 A | * | 2/1959 | Brandt | 405/171 |
| 2,923,916 A | * | 2/1960 | Woodworth | 367/155 |
| 3,435,410 A | * | 3/1969 | Babb | 367/18 |
| 3,921,755 A | * | 11/1975 | Thigpen | 181/122 |
| 4,241,427 A | * | 12/1980 | Swenson | 367/20 |
| 4,398,276 A | | 8/1983 | Kruppenbach | 367/191 |
| 4,491,939 A | * | 1/1985 | Carpenter | 367/20 |
| 4,496,796 A | * | 1/1985 | Matikainen et al. | 174/101.5 |
| 4,734,891 A | * | 3/1988 | McGowan et al. | 367/15 |
| 4,979,296 A | * | 12/1990 | Langner et al. | 29/890.144 |
| 5,088,067 A | * | 2/1992 | Sullivan et al. | 367/4 |
| 5,184,328 A | * | 2/1993 | Dumestre, III | 367/4 |
| 5,341,348 A | * | 8/1994 | Farris | 367/20 |
| 5,341,358 A | * | 8/1994 | Kobayashi et al. | 369/100 |
| 5,459,695 A | * | 10/1995 | Manison | 367/18 |
| 5,793,702 A | * | 8/1998 | Paffenholz | 367/24 |
| 5,902,430 A | * | 5/1999 | Carpenter et al. | 156/148 |
| 5,943,293 A | * | 8/1999 | Luscombe et al. | 367/20 |
| 6,021,091 A | * | 2/2000 | Gaiser | 367/20 |
| 6,034,923 A | * | 3/2000 | Wooters | 367/21 |
| 6,381,397 B1 | * | 4/2002 | Bevan et al. | 385/139 |
| 6,424,768 B1 | * | 7/2002 | Booth et al. | 385/102 |
| 6,580,033 B1 | * | 6/2003 | Goldner et al. | 174/72 A |
| 2001/0035311 A1 | * | 11/2001 | He et al. | 181/110 |

FOREIGN PATENT DOCUMENTS

WO     WO 00/26695     * 5/2000

* cited by examiner

*Primary Examiner*—Jack W Keith
*Assistant Examiner*—Scott A Hughes
(74) *Attorney, Agent, or Firm*—Madan, Mossman & Sriram, P.C.

(57) ABSTRACT

A seismic ocean bottom cable array is provided for use in subsurface exploration. The array includes receiver stations for measuring seismic signals, and a cable including conductors for data transmission and an externally attached stress member. The array is assembled during deployment by attaching the data transmission cables and receiver stations to the stress member as it is lowered into the water.

19 Claims, 4 Drawing Sheets

PERMANENTLY INSTALLED SEISMIC OCEAN BOTTOM CABLE

CROSS-REFERENCE TO RELATED APPLICATIONS

This application claims priority from U.S. Provisional Patent Application Ser. No. 60/334,284, filed Nov. 30, 2001.

FIELD OF THE INVENTION

The invention relates to ocean bottom cable arrays (OBC arrays) used in marine seismic surveys and in particular to OBC arrays adapted for permanent placement on the ocean floor.

DESCRIPTION OF THE RELATED ART

Marine seismic exploration surveys are conducted in two ways: seismic sensors (e.g. pressure sensors, motion sensors, or a combination of both) are deployed behind a vessel and towed just below the ocean surface, or they are deployed and placed on the ocean floor. A survey where sensors are placed on the ocean floor is often referred to as an ocean bottom seismic (OBS) survey. The OBS survey involves the steps of: placing an OBC array, collecting data, and the optional step of retrieving the OBC array.

The OBC array 2, as shown schematically in FIG. 1(a) is generally comprised of one or more ocean bottom cables (OBCs) 4 that are mechanically and electrically connected together. OBCs are generally constructed with a plurality of electrical or optical conductors 6 for transmitting signals, one or more stress members 8 for transmitting axial forces along the OBC, connectors 10 for terminating the conductors and stress members at each end of the OBC and transmitting electrical signals and mechanical forces between OBCs, a waterproof jacket 12 that surrounds the conductors and stress members, and one or more receiver stations 14 each having one or more seismic sensors. The receiver stations usually contain the sensors in a hermetically sealed housing. The receiver station is often rigidly attached to the OBC such that it is designed to survive deployment and retrieval operations without encountering mechanical or electrical failure.

The stress member is designed to provide the primary axial load carrying capability of the OBC. The stress member is generally manufactured into the OBC construction such that it is integrated into the OBC and the OBC is handled as a single unit when it is loaded onto a vessel and later deployed. A problem with this approach is the size and weight of the integrated OBC and the size and complexity of the handling equipment required to deal with the cable.

Each end of the OBC typically has a connector that terminates the ends of the conductors and stress members at substantially the same point so that multiple OBCs may be connected end-to-end to create an OBC array. An OBC of this type is seldom longer than 200 meters. An OBC array comprised of this type of OBC does not have a continuous conductor or stress member along its length because the conductors and stress members terminate simultaneously at spaced apart connectors along the length of the OBC array. OBCs have long been constructed to survive many deployment and retrieval operations. Deployment and retrieval specifications normally require that an OBC be mechanically robust, because it must support it's own weight in tension while being waterproof and carrying the required number of conductors. Terminations and connectors for OBCs tend to be bulky and therefore complex to design, expensive and prone to failure.

A consequence of the traditional OBC construction is the cable's high mechanical rigidity. The high rigidity allows noise transmitted into one part of the OBC to migrate throughout the cable to receiver stations along the cable, reducing the system signal-to-noise ratio. In particular, stress members provide an ideal path for noise transmission. Traditional OBCs with receiver stations that are rigidly coupled to the cable provide little or no damping mechanism between the cable and the receiver station.

A desirable OBC includes receiver stations that are rigidly coupled to the cable during deployment, but become significantly decoupled prior to a survey such that signal-to-noise ratio is improved.

OBCs are also used for reservoir monitoring, where multiple surveys are conducted in the same area over a period of years. OBCs may be deployed and retrieved for each survey or they may be permanently left at the survey location. Permanently placed OBCs have the advantage of not requiring a retrieval step. Retrieval processes usually place more forces on an OBC than deployment processes. Therefore, the traditional OBC is commonly overdesigned for permanent placement. A simple and inexpensive OBC is desirable for permanent placement at the ocean bottom to perform seismic surveys and reservoir monitoring.

SUMMARY OF THE INVENTION

This invention provides an OBC array embodying features of the invention including one or more conductor cables, a plurality of receiver stations coupled to the conductor cables, and a stress member coupled externally to the conductor cables.

In a preferred embodiment, the stress member may be substantially continuous along the length of the OBC array. In another embodiment, the OBC array may include a layer of material that surrounds the stress member and the seismic cable. In another embodiment, the layer may be a yarn braid or an extruded thermoplastic.

Also in accordance with the invention a method is provided of deploying a marine seismic array from a vessel into a body of water. The method includes the steps of deploying a continuous stress member from the vessel and attaching a seismic cable to the stress member before the seismic cable and the stress member are deployed into the body of water. The method of attaching the cable to the stress member may be done optionally on the vessel. The method of attaching may further include applying a braid around the stress member and the seismic cable. The method may also be done by feeding the stress member and the seismic cable into a braiding system.

For a better understanding of the present invention, together with other and further objects thereof, reference is made to the following description, taken in conjunction with the accompanying drawings, and its scope will be pointed out in the appending claims.

DESCRIPTION

Figure 1A:
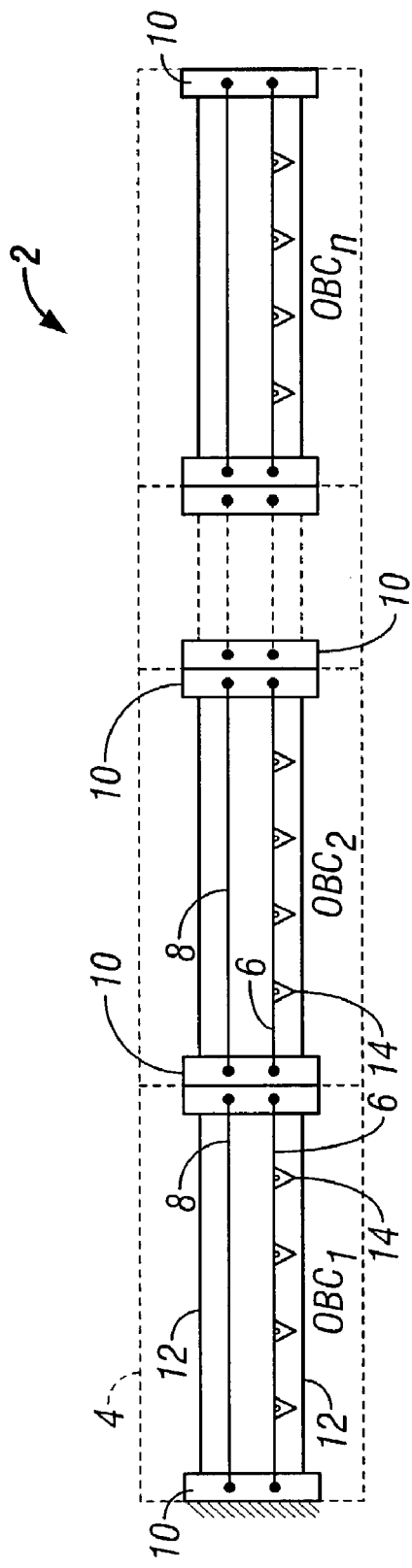
FIGS. 1A-1C are side views of an ocean bottom cable.
Figure 1B:
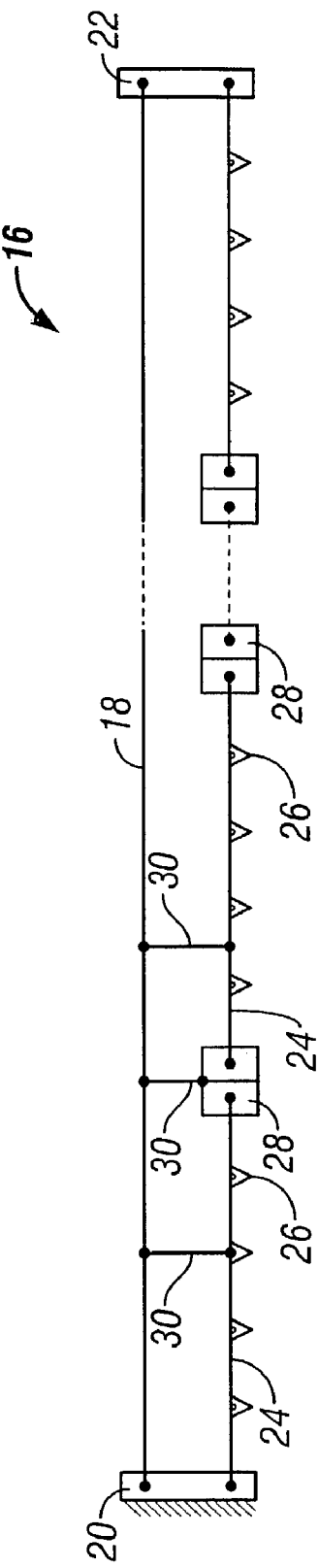

An improved OBC array 16 is represented schematically in FIG. 1(b). The OBC array includes a stress member 18 with first and second ends 20 & 22. Conductor cables 24 include receiver stations 26 at spaced apart locations and are coupled end-to-end with electrical connectors 28 that transmit electrical or optical signals between the conductor cables. As opposed to prior art designs, electrical and mechanical terminations are not necessarily co-located as in FIG. 1(a) in order to assemble the OBC array.

Figure 1C:
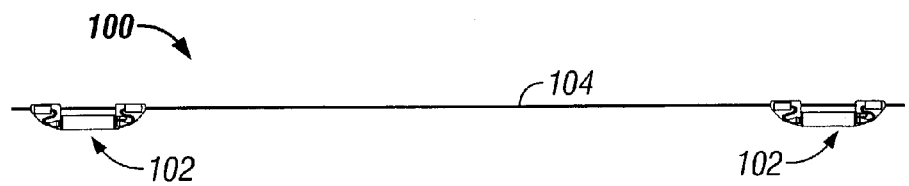
Figure 2:
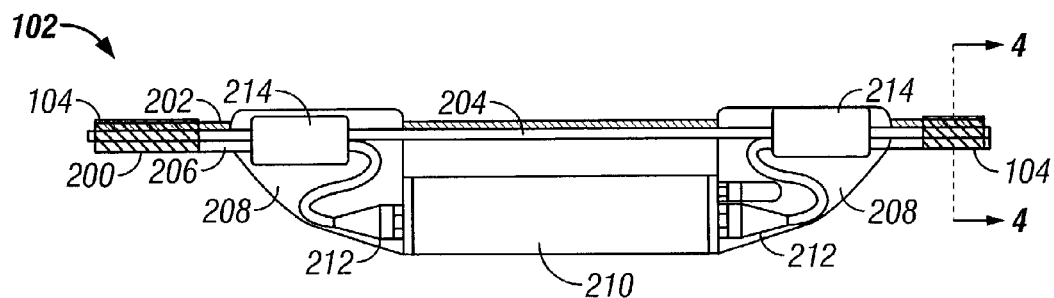
FIG. 2 is a side view of a receiver station attached to the ocean bottom cable.
Figure 4:
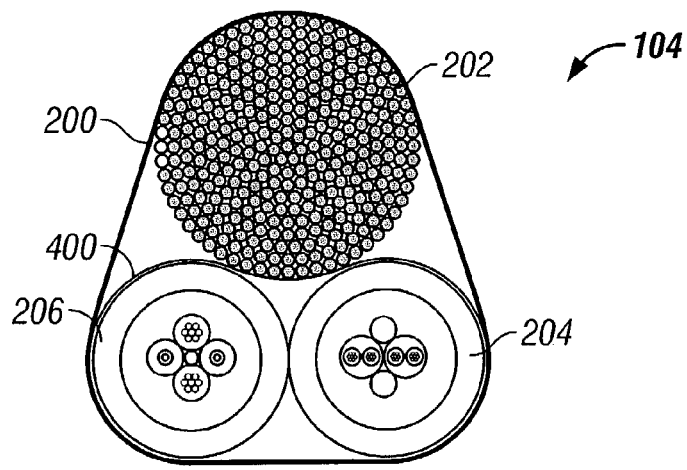
FIG. 4 is a cross-section view of the ocean bottom cable shown in FIG. 2.

An OBC array 100 is also shown in FIG. 1(c) and includes multiple, spaced apart receiver stations 102 positioned along a cable 104. FIG. 2 shows an exemplary version of the receiver station 102 attached to the cable 104. Referring to FIG. 2 and FIG. 4, the cable 104 includes a stress member 202, a first conductor cable 204, and a second conductor cable 206. The stress member 202 provides substantially all of the axial load bearing capacity for the cable 104. The first conductor cable 204 and the second conductor cable 206 are both constructed of multiple, insulated, electrical and/or optical conductors surrounded by an extruded waterproof jacket. The stress member 202 is preferably external to the first conductor cable 204 and the second conductor cable 206 such that the first conductor cable 204 and the second conductor cable 206 are constructed independently of the stress member.

Ocean bottom cables are traditionally attached end-to-end by connectors that transmit electrical signals from electrical conductors in one ocean bottom cable to electrical conductors in another ocean bottom cable. Connectors generally also transmit mechanical forces held by internal stress members between two connected ocean bottom cables. Ocean bottom cables with internal stress members are traditionally expensive and complex in part because the connectors must terminate stress members and conductors. A benefit of an external stress member is that it may terminate at a point independent from an electrical conductor termination. In other words, a stress member 202 may terminate at a connector that does not terminate a conductor. The external stress member may be of any length independent of the electrical conductor length. In a preferred embodiment, the stress member 202 terminates only at each end of the OBC array 100 and is therefore substantially continuous along the OBC array 100. A continuous length of the stress member 202 may be up to 10-15 kilometers and would significantly reduce the number of connectors and simplify their design.

The stress member 202 may be constructed of synthetic fiber or steel and is preferably continuous along the length of the cable 104. The first conductor cable 204 and the second conductor cable 206 are secured to each other by an inner braid 400. The inner braid 400 is preferably a yarn material that is wound around the cables. Alternatively, the first conductor cable 204 and second conductor cable 206 may be secured by other means such as an extruded layer of thermoplastic or thermoset material. The cables may also be secured by discrete clamps spaced along the length of those cables. The stress member 202 is secured to the first conductor cable 204 and second conductor cable 206. The outer braid 200 surrounds the cables and the stress member 202 and is also preferably a yarn material.

Figure 3:
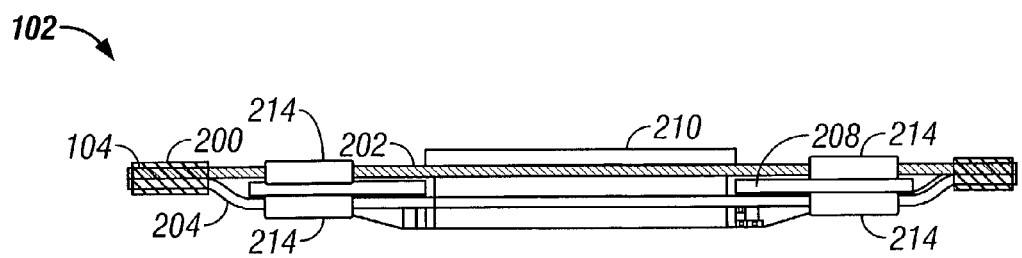
FIG. 3 is a top view of the receiver station of FIG. 1C.

Referring to FIG. 2 and FIG. 3, the receiver station 102 includes a mechanical coupling member 208 that mechanically connects the stress member 202 to the receiver housing 210. A retainer 214 couples the mechanical coupling member 208 to the stress member 202. The retainer 214 also couples the first conductor cable 204 and the second conductor cable 206 to the mechanical coupling member 208.

The mechanical coupling member optionally disengages the cable 104 from the receiver housing 210 after the receiver housing 210 is deployed. The action of disengaging may be enabled through a number of different methods. The member may be made of a material that degrades in the presence of seawater, for example, certain polyurethanes. The member may be made from a material such that application of a chemical to the member would cause the member material to degrade. The member may be made of a material that has a low melting point and the member is electrically heated in situ to physically melt the material. Such a material may be a thermoplastic or a low melting-point metal such as powder metal manufactured by Serra™. Such a metal is heated to melting points of 175° F. or higher using an electrical source of heat. The member may also be a material that acts as an anode in a galvanic reaction and would thus dissolve in seawater. The member may also be made of a material that is designed to oxidize in the presence of sea water such as aluminum. The member may also be mechanically actuated to detach the receiver station from the seismic cable.

Referring back to FIG. 1(b), the OBC array may generally be assembled using coupling member 30 to attach the stress member 18 to the receiver station 26, the electrical connector 28, or the conductor cable 24. In this fashion, the OBC array may be optimally assembled depending on the operating conditions.

The receiver housing 210 includes one or more seismic sensors such as a hydrophone, geophone, or accelerometer and may include electronics for filtering and digitizing signals from the one or more seismic sensors. An output signal from the receiver housing 210 is coupled to the second conductor cable 206 through connectors 212. The receiver housing 210 is preferably cylindrical in shape and its longitudinal axis is preferably aligned with the cable 104 longitudinal axis.

The embodiment as described above is an inexpensive array to manufacture and deploy compared to prior art systems in which the stress member is manufactured into the seismic cable. Because the stress member is coupled externally to the seismic cable, the telemetry and second conductor cables may be assembled separately from the stress member. The embodiment eliminates a need for expensive cable manufacturing equipment and allows the designer to select an inexpensive stress member. The embodiment also reduces the typical number of electrical and mechanical terminations found in the array. Traditional systems use custom connectors that are designed to terminate electrical or optical conductors at the receiver housing while transferring axial mechanical loads to the receiver housing. The continuous stress member eliminates the need to transfer loads through the housing and results in a simple connector design.

Figure 5:
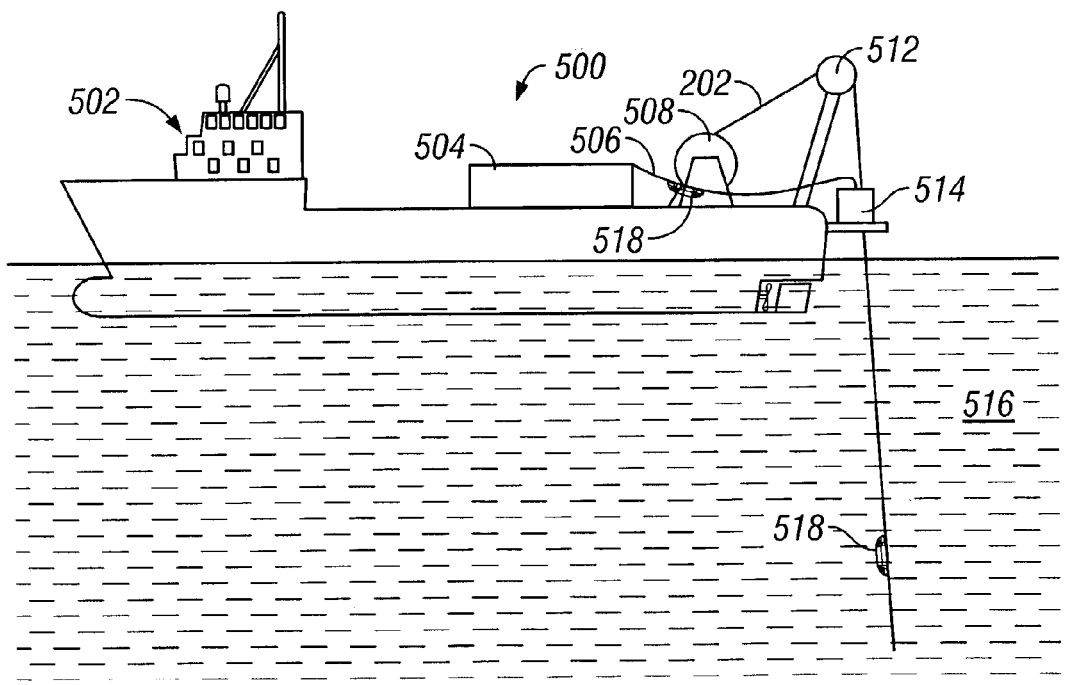
FIG. 5 is a side view of a vessel with OBC deploying equipment.
Figure 6:
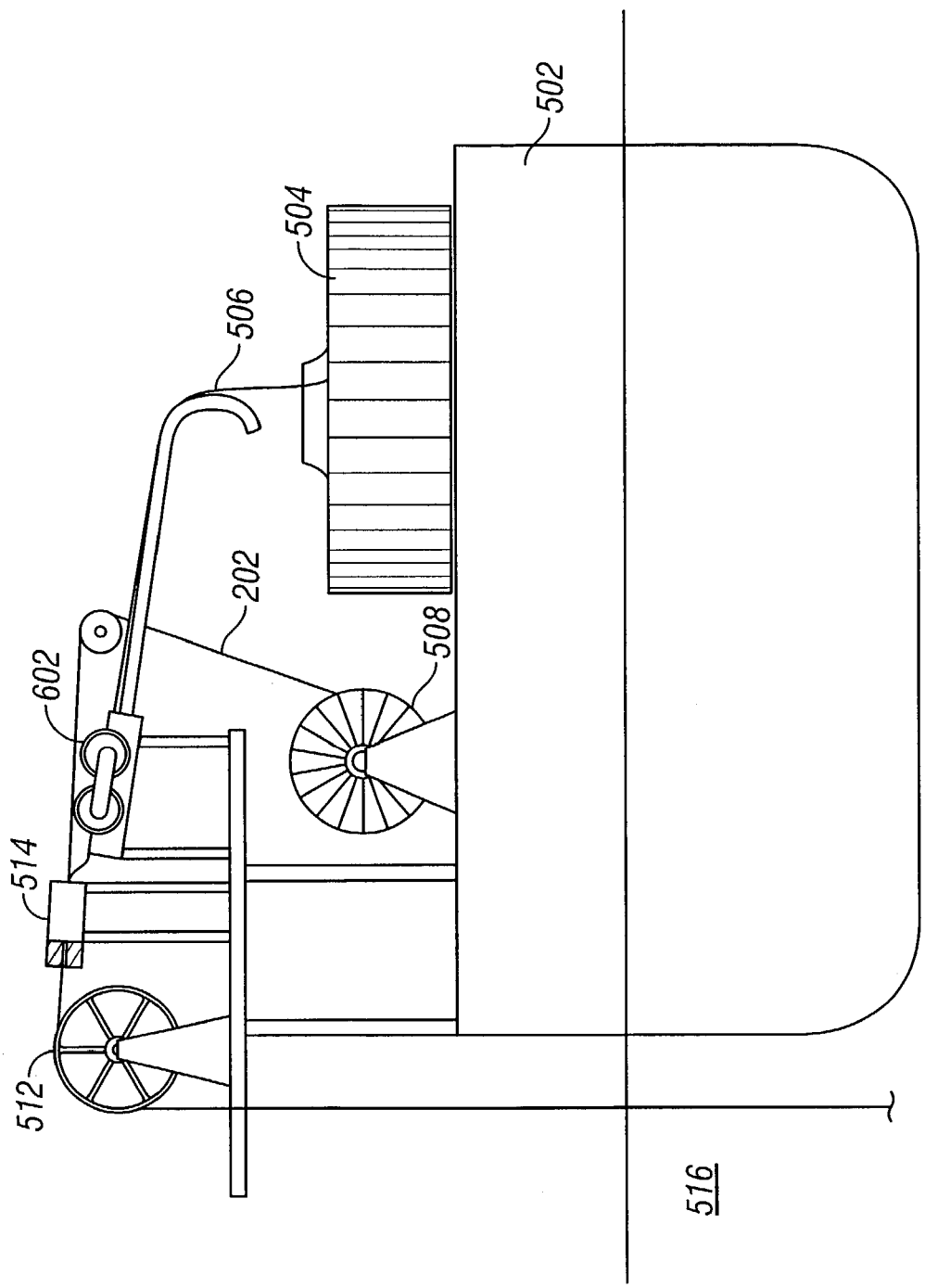
FIG. 6 is a side view of an alternative embodiment of OBC deploying equipment.

Referring to FIG. 5 and FIG. 6, a seismic cable deployment system 500 is shown. A vessel 502 deploys a seismic cable 506 from a storage bin 504 into a body of water 516. The vessel 502 may be of the type that is typically used for deployment and retrieval of ocean bottom seismic cables. The seismic cable 506 includes one or more receiver stations 518 and one or more conductor cables. The storage bin 504 is used to secure the seismic cable 506 on the vessel deck, but the same function may be accomplished using a reel.

The stress member 202 is unwound from a reel 508 over a sheave 512 and is attached to the seismic cable 506. The sheave 512 is preferably at least 3 meters in diameter. A wire tensioner 602 deploys the seismic cable 506 from the storage bin 504. The wire tensioner 602 is a two-wheel wire winch that preferably controls the cable deployment speed from 0-20 meters/minute. As the wire tensioner 602 deploys the seismic cable 506, the reel 508 deploys the stress member and maintains a tension force on the stress member 202 such that the reel bears most of the weight of the seismic cable 506 as it is deployed Optionally, the stress member 202 may be deployed from a storage bin that is not shown. In that case, a back-tensioner must then be used to provide the tension force.

Again referring to FIG. 5 and FIG. 6, a braiding system 514 attaches the seismic cable 506 to the stress member 202 while simultaneously deploying both. The braiding system 514 is well known in the art of cable manufacturing. The braiding system 514 may preferably be placed in the deployment system such that the stress member and seismic cable are joined just before entering the water. In this fashion, the seismic cable experiences minimal tensile or bending forces. Reduced forces allow the cable and connector design to be relatively simple and inexpensive.

The resulting OBC array and deployment system are designed for cost-effective manufacturing and deployment. As opposed to simultaneous deployment, the seismic cable 506 and stress member 202 may optionally be joined at a location not on the vessel and subsequently loaded onto the vessel for deployment. While the OBC array is ideally intended for permanent placement on the ocean bottom, these concepts may be applied to a retrievable cable design.

Although the invention has been described in detail in the reference to a preferred version, other versions are possible. Therefore, the spirit and scope of the claims should not be limited to the preferred version described in detail.

What is claimed is:

1. An ocean-bottom-cable (OBC) array comprising:
   (a) a plurality of cable sections, each cable section including one or more conductor cables that terminate at each end at an electrical connector, wherein the plurality of cable sections are connected at the electrical end connectors of the cable sections to form the OBC array;
   (b) a plurality of spaced apart receiver stations coupled to the one or more conductor cables of the plurality of cable sections;
   (c) a stress member mechanically coupled externally to the one or more conductor cables, wherein the stress member is substantially continuous along the length of the OBC array and wherein the stress member is braided to the one or more conductor cables;
   (d) a braiding system on a marine vessel that joins the stress member and the plurality of seismic cable sections; and
   (e) a mechanical coupling member mechanically coupling a receiver housing of at least one of the plurality of the spaced apart receiver stations to the stress member.

2. The OBC array of claim 1 further comprising a layer of material that surrounds the stress member and the one or more conductor cables.

3. The OBC array of claim 2 wherein the layer is a yarn braid.

4. The OBC array of claim 2 wherein the layer is an extruded thermoplastic.

5. The OBC array of claim 1 further comprising a retainer coupling the mechanical coupling member to the stress member.

6. The OBC array of claim 1, wherein the receiver station includes a seismic sensor having at least an accelerometer.

7. The OBC array of claim 1, wherein the receiver station includes electronics for at least one of (i) filtering signals and (ii) digitizing signals.

8. An ocean-bottom-cable (OBC) array comprising:
   (a) a plurality of seismic cable sections connected at ends by electrical connector, each seismic cable section including one or more conductor cables and a substantially continuous stress member that is mechanically coupled to one or more of the plurality of seismic cable sections and wherein the substantially continuous stress member is braided to the one or more conductor cables;
   (b) a braiding system on a marine vessel that joins the stress member and the plurality of seismic cable sections;
   (c) a receiver station coupled to one or more of the plurality of seismic cable sections; and
   (d) a mechanical coupling member mechanically coupling a receiver housing of the receiver station to the stress member, the mechanical coupling member configured to disengage the receiver housing from the stress member after the OBC array deployment in a body of water.

9. The OBC array of claim 8 further comprising a retainer coupling the mechanical coupling member to the stress member.

10. The OBC array of claim 9, wherein the retainer also couples the mechanical coupling member to the one or more conductor cables.

11. The OBC array of claim 8, wherein the receiver station includes a seismic sensor having at least a accelerometer.

12. The OBC array of claim 8, wherein the receiver station includes electronics for at least one of (i) filtering signals and (ii) digitizing signals.

13. A method for deploying an ocean-bottom-cable (OBC) array, the method comprising:
   providing a plurality of seismic cable sections, each seismic cable section having one or more data conductor cables terminating at an electrical connector at each end of the seismic cable section;
   connecting the plurality of seismic cable sections at the electrical end connectors of the seismic cable sections to form a string;
   placing a substantially continuous stress member proximate the string;
   mechanically coupling the stress member external to the plurality of seismic cable sections;
   coupling at least one receiver housing of a receiver station to the stress member;
   braiding the stress member with the plurality of seismic cable sections before entering a body of water, wherein a braiding system on a marine vessel joins the stress member and the plurality of seismic cable sections; and
   deploying the OBC array into a body of water.

14. The method of claim 13, further comprising disengaging the at least one receiver housing of the receiver station from the stress member after the OBC array deployment, wherein disengaging includes at least one of (i) applying heat, (ii) applying a chemical, and (iii) mechanically decoupling the at least one receiver from the stress member.

15. The method of claim 13, wherein the seismic cable is formed separately from the stress member.

16. The method of claim 13, wherein the substantially continuous stress member terminates only at each end of the OBC array.

17. The method of claim 13, further comprising:
   placing the seismic cable sections on the marine vessel; and
   placing the stress member separate from the plurality of seismic cable sections on the marine vessel.

18. The method of claim 13, further comprising:
   deploying the plurality of seismic cable sections from one of (i) a reel, and (ii) a storage bin; and
   deploying the stress member from one of (i) a reel, and (ii) a storage bin.

19. The method of claim 13, further comprising:
   attaching the plurality of seismic cable sections to the stress member while simultaneously deploying the plurality of seismic cable sections and the stress member into the body of water.

* * * * *